United States Patent Office 3,711,377
Patented Jan. 16, 1973

3,711,377
METHOD OF PRODUCTION OF UROKINASE
Nathan H. Sloane, Germantown, Tenn., assignor to
Barbara Sloane, Germantown, Tenn.
No Drawing. Filed Oct. 22, 1970, Ser. No. 60,162
Int. Cl. C07g 7/026
U.S. Cl. 195—66 B           10 Claims

ABSTRACT OF THE DISCLOSURE

Urokinase is extracted from human urine by passing the voided urine directly through an absorbent that is placed in a tray in the male urinal. The passage of the voided urine through the absorbent contained in such a filtering device in the urinal allows the direct absorption of the enzyme activator, urokinase, onto the absorbent without collecting bulk urine; and the system allows the passage of the absorbed urine (freed of its urokinase) to flow directly into the sewer system. The absorbents used in this system are: Florisil, charcoal, aluminum oxide, denatured human proteins embedded in a Silastic matrix. The urokinase is solubilized from these absorbents and further purified. Urokinase is removed from Florisil, charcoal and aluminum oxide by cold weak acid saturated with ethyl methyl ketone. Urokinase is removed from the Silastic embedded absorbents, denatured human proteins.

---

The urokinase concentrate (after removal of solvent and excess acid or alkali by dialysis) can be further purified by methods described by Sloane in U.S. Pat. Nos. 3,477,910, 3,477,911, 3,477,912 and 3,477,913, patented on Nov. 11, 1969.

BACKGROUND OF THE INVENTION

(I) Field of the invention

This invention relates to methods for the production and purification of urokinase. In particular, it relates to methods for the extraction of urokinase from human urine by its absorption on various absorbents which are placed in a tray that fits into a male urinal, to allow direct absorption of the urokinase that is contained in the voided human urine. The absorbents that can be used in this system include Florisil, a synthetic magnesia silica gel (Floridin Company), charcoal, aluminum oxide, denatured human protein precipitates embedded in a Silastic matrix and then shredded to expose the absorbent. The urokinase is then eluted from the absorbent and further purified. The urokinase is eluted from Florisil and charcoal after removal of inert proteins by extraction with cold weak alkali containing sodium deoxycholate. Elution is accomplished by treatment of the precipitate with cold weak acid saturated with ethyl methyl ketone. Elution of the urokinase absorbed on aluminum oxide is accomplished by treatment with cold dilute alkali containing sodium deoxycholate and treatment with cold dilute acid saturated with ethyl methyl ketone. Elution of urokinase from the insoluble denatured human protein fractions is accomplished by treatment with cold dilute alkaline buffer containing sodium deoxycholate.

(II) Description of the prior art

Urokinase, a substance found in mammalian urine, is of great importance in the treatment of certain blood disorders, such as those which tend to cause the formation of blood clots in the cardiovascular system. Persons afflicted with such disorders must be treated for this condition before thrombosis occurs and such treatment frequently involves the administration of urokinase which dissolves blood clots and prevents the further formation of clots.

Urokinase is an enzyme cofactor which stimulates the production of the clot-dissolving proteolytic enzyme, plasmin, in the blood. Bacterial filtrates, such as staphylokinase, also have the ability to promote the formation of plasmin. The great quantities of urine which are available as a source of urokinase, however, make a method which utilizes this source economically desirable. The large volume of urine required to obtain sufficient amounts of urokinase require a method wherein sufficient amounts of urokinase require a method wherein a urokinase-rich fraction of comparatively small unit volume can be quickly and efficiently isolated from the urine.

Heretofore, urokinase has been obtained from urine by its absorption on benzoic acid as disclosed in U.S. Pat. No. 2,989,440, patented June 20, 1961. Benzoic acid does not combine chemically with urokinase, but rather, the urokinase is absorbed on the benzoic acid and, as a result, necessitates a number of cumbersome and inefficient steps for its purification. The process disclosed in the foregoing patent is, therefore, not entirely satisfactory for those reasons.

The use of tannic acid, tannic acid-nucleoprotein complex and inactivated proteins in the purification of urokinase from human urine has been disclosed in U.S. Pats. Nos. 3,477,910, 3,477,911, 3,477,912 and 3,477,913, patented on Nov. 11, 1969.

The use of bentonite or aluminum silicate for the absorption of urokinase from human urine and its elution by weak acid (pH 1.5–3) or aqueous 6,9-diamino-2-ethoxyacridine has been disclosed in U.S. Pat. No. 3,355,361 and British Pat. 1,068,917, May 17, 1967. Although the above patents yield urokinase concentrates, the present procedures described herein are very useful because simple human urine collection procedures produce highly active urokinase concentrates that can be used for further purification.

SUMMARY OF THE INVENTION

The present invention is based on the discovery that urokinase can be efficiently extracted directly from voided human urine by passing the voided urine through an absorbent contained in a filtration tray that is positioned in the urinal. The urokinase absorbs onto the absorbent and the urine-free of urokinase flows directly into the sewer system. In the process the urokinase from large volumes of urine are collected directly onto the absorbent and it is not necessary to collect bulk urine to prepare urokinase. Thus one can utilize large quantities of urine and in one basic step, efficiently extract the urokinase, effectively reducing immediately in the process the great bulk of material to be handled in isolating pure urokinase. Broadly stated, this invention comprises a method for producing urokinase directly from human urine by allowing the voided urine to flow through an absorbent contained in a filtration tray that is placed directly in the urinal.

The absorbents that can be used in this system comprise: Florisil, charcoal, aluminum oxide, denatured human protein embedded in a Silastic matrix. Elution from Florisil, charcoal and aluminum oxide is accomplished by washing with $H_2O$ and eluting the urokinase with cold weak acid saturated with ethyl methyl ketone, after first removing inert proteins by extraction with cold weak alkaline solution containing sodium deoxycholate. The urokinase is eluted from the denatured human protein by cold dilute alkaline buffer containing sodium deoxycholate.

DESCRIPTION OF THE PREFERRED PRACTICE OF THE INVENTION

The use of in situ collection methods for the isolation and purification of urokinase is herein described. The advantage of these methods for purifying urokinase lies in the simplicity of the collection of urokinase directly onto the absorbent and allows direct absorption of the activator from human urine voided into urinals without the collection of urine in bulk. The human urine voided into the urinal passes through the absorbent granules (in a plastic tray) of Florisil or granules of charcoal and aluminum oxide, or the denatured human protein, denatured human serum-tannate-nucleic acid complex described in U.S. Pats. 3,477,910; 3,477,911; 3,447,912; 3,377,913. The ability of these denatured protein fractions to act as absorbents in this system depends upon the granulation of these substances into the proper form to allow flow of the urine through the absorbing granules. These fractions are therefore embedded into a Silastic rubber and then the silastic-insoluble protein residue mixture is polymerized. After the Silastic rubber cake is formed, the absorbing surfaces of the absorbents are exposed by shredding the Silastic rubber into granules and these granules are then placed into the trays that are placed in the urinals.

The trays that are fitted into the urinals are designed of plastic or metal and are so constructed to fit slightly above the bottom outlet and slightly forward of the back of the urinal so that flushing of the urinal after use will not disturb the absorbent but will flush the urine after it has passed through the absorbent. The bottom of the tray (onto which is placed the absorbing granules) is constructed of mesh, either stainless steel or cloth. The top of the tray which rests below the front top of the urinal contains a removal cover of plastic with numerous holes drilled into the cover so that the voided urine flows through the absorbent evenly. The back of the tray has a shield constructed of plastic or metal so that urine voided above the top of the tray's cover is directed to flow through the absorbent.

EXAMPLE 1

The filtration tray is filled with Florisil 15–60 mesh (admixed with dichlorobenzene as antibacterial agent); urine is voided through the absorbent; the absorbent is washed with $H_2O$; the urokinase is eluted from the Florisil by cold 0.1 N HCl saturated with ethylmethylketone, after inert proteins and pigments are first removed by elution with cold weak alkali (pH 9.3 tris-HCl buffer); and cold 0.001 N HCl after the tris buffer has been washed out of the Florisil with cold $H_2O$. The urokinase-containing eluate is further purified by methods described in previous U.S. Pats. 3,477,910, 3,477,911, 3,477,912 and 3,477,913, issued Nov. 11, 1969.

EXAMPLE 2

The filtration tray is filled with granulated charcoal (with dichlorobenzene), approximately 15–30 mesh. Voided human urine is passed through this absorbent. The absorbed urokinase is recovered by elution with cold 0.1 N HCl-saturated with ethylmethylketone after removal of inert proteins and pigments with cold tris-HCl (pH 9.3) cold $H_2O$ and cold 0.001 N HCl.

EXAMPLE 3

Aluminum oxide (15–30 mesh with dichlorobenzene) is placed in the tray and voided human urine is passed through the absorbent. The urokinase is eluted by treatment with tris-HCl at pH 9.3 containing sodium deoxycholate 5 mg. per ml. and finally residual urokinase eluted with cold 0.1 N HCl saturated with ethylmethylketone.

EXAMPLE 4

The tray is filled with denatured human uprotein, human serum-tannate-nucleate (with dichlorobenzene) embedded in Silastic rubber matrix which has been shredded into small granules (approximately 15–30 mesh). Voided human urine is passed through the absorbent. The urokinase is eluted from the matrix by treatment with cold weak alkaline buffer (tris-HCl pH 9.3).

I claim:

1. A method for purifying and concentrating urokinase from urine comprising passing voided urine directly through an absorbent that is placed in a filtration tray in a urinal whereby the urokinase is absorbed onto the absorbent and then recovering the urokinase from the absorbent.

2. A method according to claim 1 in which the tray containing the absorbent is placed in the urinal to allow voided urine to flow through the absorbent to allow absorption of the urokinase onto the absorbent and to allow absorbed urine to flow into the sanitary sewer system after the urine flowed through the absorbent in situ.

3. A method according to claim 1 in which the absorbent added to the tray that is placed in the urinal is Florisil to absorb the urokinase from human urine.

4. A method according to claim 3 in which the absorbed urokinase is eluted by dilute mineral acid (0.01–0.1 1 N) saturated with ethylmethylketone.

5. A method according to claim 1 in which the absorbent added to tray that is placed in the urinal is charcoal to absorb urokinase from human urine.

6. A method according to claim 5 in which the absorbed urokinase is eluted by dilute mineral acid (0.01–0.1 N) saturated with ethylmethylketone.

7. A method according to claim 1 in which the absorbent added to the tray is placed in the urinal is aluminum oxide to absorb urokinase from human urine.

8. A method according to claim 7 in which the absorbed urokinase is eluted by dilute alkaline (pH 8.5–9.5) followed by dilute acid (0.01–0.1 N) saturated with ethylmethylketone.

9. A method according to claim 1 in which the absorbent added to the tray that is placed in the urinal is human serum-nucleic acid-tannate complex embedded in Silastic matrix and shredded into granules.

10. A method according to claim 9 in which the absorbed urokinase is eluted from the matrix by dilute alkaline (pH 8.5–9.5) buffer solution.

References Cited

UNITED STATES PATENTS 3,466,145  9/1969  Van Duyne _____ 23—253 R
3,542,646  11/1970  Aoki et al. _____ 195—66 B LIONEL M. SHAPIRO, Primary Examiner U.S. Cl. X.R.
424—99; 128—2 R